US011978210B1

(12) United States Patent
Wei et al.

(10) Patent No.: US 11,978,210 B1
(45) Date of Patent: May 7, 2024

(54) LIGHT REGULATION METHOD, SYSTEM, AND APPARATUS FOR GROWTH ENVIRONMENT OF LEAFY VEGETABLES

(71) Applicant: China Agricultural University, Beijing (CN)

(72) Inventors: Yaoguang Wei, Beijing (CN); Dong An, Beijing (CN); Han Li, Beijing (CN); Jincun Liu, Beijing (CN); Daoliang Li, Beijing (CN); Yingyi Chen, Beijing (CN)

(73) Assignee: China Agricultural University, Beijing (CN)

( * ) Notice: Subject to any disclaimer, the term of this patent is extended or adjusted under 35 U.S.C. 154(b) by 0 days.

(21) Appl. No.: 18/382,282

(22) Filed: Oct. 20, 2023

(30) Foreign Application Priority Data

Apr. 6, 2023 (CN) .......................... 202310353974.7

(51) Int. Cl.
*G06T 7/00* (2017.01)
*A01G 7/04* (2006.01)
(Continued)

(52) U.S. Cl.
CPC ............ *G06T 7/0016* (2013.01); *A01G 7/045* (2013.01); *A01G 22/15* (2018.02); *G06T 7/11* (2017.01);
(Continued)

(58) Field of Classification Search
CPC . G06T 7/0016; G06T 7/11; G06T 7/62; G06T 7/90; G06T 2207/10024;
(Continued)

(56) References Cited

U.S. PATENT DOCUMENTS

2017/0278261 A1* 9/2017 Focht ...................... G06T 7/194
2018/0012344 A1* 1/2018 Jens ....................... G06T 7/0004
(Continued)

FOREIGN PATENT DOCUMENTS

CN 112930926 A 6/2021
CN 114269041 A 4/2022

OTHER PUBLICATIONS

Shreya Vaidya et al.; "Leveraging YOLOv 7 for Plant Disease Detection", 20,234th International Conference on Innovative Trends in Information Technology (ICITIIT); Feb. 12, 2023.
(Continued)

*Primary Examiner* — Ali Bayat
(74) *Attorney, Agent, or Firm* — Kirk A. Wilson; Joseph T. Guy; Patent Filing Specialist Inc.

(57) ABSTRACT

The present disclosure relates to the technical field of growth environment control for plants, and provides a light regulation method, system, and apparatus for a growth environment of leafy vegetables. The method includes: obtaining a growth environment image and growth environment light parameters of leafy vegetables; inputting the growth environment image into an image segmentation model to obtain an initial pixel segmentation map; determining a leaf area of the leafy vegetables according to the initial pixel segmentation map by using a Class Activation Mapping (CAM)-K algorithm; inputting the leaf area and the growth environment light parameters of the leafy vegetables into a leafy vegetable growth index prediction model to obtain a growth index of the leafy vegetables; adjusting the growth environment light parameters according to the growth index of the leafy vegetables. This disclosure achieves automated and intelligent control of light conditions in the growth environment of leafy vegetables.

9 Claims, 7 Drawing Sheets

(51) Int. Cl.
*A01G 22/15* (2018.01)
*G06T 7/11* (2017.01)
*G06T 7/62* (2017.01)
*G06T 7/90* (2017.01)
*G06V 10/26* (2022.01)
*G06V 10/762* (2022.01)
*G06V 10/774* (2022.01)
*G06V 10/82* (2022.01)
*A01G 31/02* (2006.01)

(52) U.S. Cl.
CPC .................. *G06T 7/62* (2017.01); *G06T 7/90* (2017.01); *G06V 10/26* (2022.01); *G06V 10/763* (2022.01); *G06V 10/774* (2022.01); *G06V 10/82* (2022.01); *A01G 31/02* (2013.01); *G06T 2207/10024* (2013.01); *G06T 2207/10028* (2013.01); *G06T 2207/20081* (2013.01); *G06T 2207/20084* (2013.01); *G06T 2207/30188* (2013.01)

(58) Field of Classification Search
CPC . G06T 2207/10028; G06T 2207/20081; G06T 2207/20084; G06T 2207/30188; A01G 7/045; A01G 22/15; A01G 31/02; G06V 10/26; G06V 10/763; G06V 10/774; G06V 10/82
USPC .......................................................... 382/110
See application file for complete search history.

(56) References Cited

U.S. PATENT DOCUMENTS

| | | | |
|---|---|---|---|
| 2021/0233229 A1* | 7/2021 | Hyatt | G06T 7/0004 |
| 2023/0152232 A1* | 5/2023 | Kim | G01N 21/31 |
| | | | 356/326 |
| 2023/0281791 A1* | 9/2023 | Hyatt | G06V 10/764 |
| | | | 382/141 |
| 2024/0032485 A1* | 2/2024 | Ball | H05B 47/105 |

OTHER PUBLICATIONS

Kemal Hac efendioglu . . . "CAM-K: a novel framework for automated estimating pixel area using K-Means algorithm integrated w/deep learning based-CAM visualization techniques".

* cited by examiner

LIGHT REGULATION METHOD, SYSTEM, AND APPARATUS FOR GROWTH ENVIRONMENT OF LEAFY VEGETABLES

CROSS REFERENCE TO RELATED APPLICATION

This patent application claims the benefit and priority of Chinese Patent Application No. 2023103539747, filed with the China National Intellectual Property Administration on Apr. 6, 2023, the disclosure of which is incorporated by reference herein in its entirety as part of the present application.

TECHNICAL FIELD

The present disclosure relates to the technical field of plant growth environment control, and in particular, to a light regulation method, system, and apparatus for a growth environment of leafy vegetables.

BACKGROUND

Currently, with the growth of the world's population and the development of industrialization, human activities, with a growing range and higher intensity, have caused great damage to environmental resources. Changes in environmental factors inevitably affect crop growth, and extreme weather such as rainstorms and strong winds can cause uncontrollable crop quality.

With the development of hydroponic technology, hydroponic leafy vegetables are more time-saving and labor-saving than traditionally planted leafy vegetables. The hydroponic technology has greater control over environmental factors and breaks through seasonal limitations, resulting in higher yields. In the current method for regulating a light environment of leafy vegetables, a growth status and growth stage of the vegetables are determined manually, and then a supplementary light is turned on or off manually. This method fails to intelligently determine the growth status of the leafy vegetables and adjust an on/off cycle of the supplementary light according to the growth status.

SUMMARY

An objective of the present disclosure is to provide a light regulation method, system, and apparatus for a growth environment of leafy vegetables, achieving automated and intelligent control of light conditions in a growth environment of leafy vegetables.

To achieve the above objective, the present disclosure provides the following technical solutions.

A light regulation method for a growth environment of leafy vegetables is provided, including:
  obtaining a growth environment image and growth environment light parameters of leafy vegetables, where the growth environment image includes the leafy vegetables and non-leafy-vegetable components; the non-leafy-vegetable components include a cultivation frame and a foam board; and the light parameters include light intensity, a light spectrum ratio, and a photoperiod;
  inputting the growth environment image into an image segmentation model to obtain an initial pixel segmentation map, where the image segmentation model is obtained by training a YOLOv7 object detection network using a first training dataset, and the first training dataset includes a plurality of training leafy vegetable growth environment images and corresponding training pixel segmentation maps;
  determining a leaf area of the leafy vegetables according to the initial pixel segmentation map by using a Class Activation Mapping (CAM)-K algorithm, where the CAM-K algorithm includes a CAM algorithm and a K-Means clustering algorithm;
  inputting the leaf area and the growth environment light parameters of the leafy vegetables into a leafy vegetable growth index prediction model to obtain a growth index of the leafy vegetables, where the leafy vegetable growth index prediction model is obtained by training a Long Short-Term Memory (LSTM) network using a second training dataset, the second training dataset includes a plurality of groups of second training data, and the second training data includes leaf areas, growth environment light parameters, and growth indexes of training leafy vegetables at different time points;
  adjusting the growth environment light parameters according to the growth index of the leafy vegetables.

Optionally, a training process of the image segmentation model specifically includes:
  obtaining the plurality of training leafy vegetable growth environment images;
  performing pixel-level annotation on each training leafy vegetable growth environment image to obtain a corresponding training pixel segmentation map;
  training the YOLOv7 object detection network with the plurality of training leafy vegetable growth environment images as inputs and the corresponding pixel segmentation maps as outputs, to obtain the image segmentation model.

Optionally, the determining a leaf area of the leafy vegetables according to the initial pixel segmentation map by using a CAM-K algorithm specifically includes:
  performing CAM visualization on the initial pixel segmentation map by using the CAM algorithm, to obtain a visualized pixel segmentation map;
  overlaying the visualized pixel segmentation map with the initial pixel segmentation map to obtain an overlaid pixel map;
  performing clustering on the overlaid pixel map by using the K-Means clustering algorithm to obtain a clustered image;
  determining the leaf area of the leafy vegetables according to the clustered image.

Optionally, a training process of the leafy vegetable growth index prediction model specifically includes:
  obtaining leaf areas and growth environment light parameters of each training leafy vegetable at different time points from the second training data;
  calculating a growth index of each training leafy vegetable according to the leaf areas and the growth environment light parameters at different time points;
  training the LSTM network by using all the leaf areas and the corresponding growth environment light parameters as inputs and the growth indexes of all the training leafy vegetables as labels, to obtain the leafy vegetable growth index prediction model.

Optionally, the obtaining a growth environment image of leafy vegetables specifically includes:
  obtaining an RGB image and a corresponding depth image of an environment of the leafy vegetables;

determining the RGB image and the corresponding depth image of the environment of the leafy vegetables as the growth environment image.

Optionally, the determining the leaf area of the leafy vegetables according to the clustered image specifically includes:

determining the number of pixels labeled as leaves of the leafy vegetables in the clustered image;

calculating the leaf area of the leafy vegetables according to the number of pixels.

A light regulation system for a growth environment of leafy vegetables is provided, including:

a parameter obtaining module configured to obtain a growth environment image and growth environment light parameters of leafy vegetables, where the growth environment image includes the leafy vegetables and non-leafy-vegetable components; the non-leafy-vegetable components include a cultivation frame and a foam board; and the light parameters include light intensity, a light spectrum ratio, and a photoperiod;

a segmentation module configured to input the growth environment image into an image segmentation model to obtain an initial pixel segmentation map, where the image segmentation model is obtained by training a YOLOv7 object detection network using a first training dataset, and the first training dataset includes a plurality of training leafy vegetable growth environment images and corresponding training pixel segmentation maps;

an area determining module configured to determine a leaf area of the leafy vegetables according to the initial pixel segmentation map by using a CAM-K algorithm, where the CAM-K algorithm includes a CAM algorithm and a K-Means clustering algorithm;

a growth index prediction module configured to input the leaf area and the growth environment light parameters of the leafy vegetables into a leafy vegetable growth index prediction model to obtain a growth index of the leafy vegetables, where the leafy vegetable growth index prediction model is obtained by training an LSTM network using a second training dataset, the second training dataset includes a plurality of groups of second training data, and the second training data includes leaf areas, growth environment light parameters, and growth indexes of training leafy vegetables at different time points;

a light adjustment module configured to adjust the growth environment light parameters according to the growth index of the leafy vegetables.

A light regulation apparatus for a growth environment of leafy vegetables is provided, which is used to implement the foregoing light regulation method for a growth environment of leafy vegetables. The light regulation apparatus for a growth environment of leafy vegetables includes a growth environment image obtaining device, a growth environment light parameter obtaining device, a supplementary light, and a control device. The growth environment image obtaining device, the growth environment light parameter obtaining device, and the supplementary light are connected to the control device.

The growth environment image obtaining device is configured to obtain a growth environment image of leafy vegetables, where the growth environment image includes the leafy vegetables and non-leafy-vegetable components; and the non-leafy-vegetable components include a cultivation frame and a foam board.

The growth environment light parameter obtaining device is configured to obtain growth environment light parameters of the leafy vegetables, where the growth environment light parameters include light intensity, a light spectrum ratio, and a photoperiod.

The control device is configured to:

segmenting the growth environment image of the leafy vegetables by using an image segmentation model, to obtain an initial pixel segmentation map;

determining a leaf area of the leafy vegetables according to the initial pixel segmentation map by using a CAM-K algorithm;

determining a growth index of the leafy vegetables based on the leaf area of the leafy vegetables by using a leafy vegetable growth index prediction model;

adjusting the supplementary light according to the growth index of the leafy vegetables, thereby adjusting the growth environment light parameters.

According to specific embodiments provided in the present disclosure, the present disclosure has the following technical effects:

The present disclosure provides a light regulation method, system, and apparatus for a growth environment of leafy vegetables. The method includes obtaining a growth environment image and growth environment light parameters of leafy vegetables; inputting the growth environment image into an image segmentation model to obtain an initial pixel segmentation map; determining a leaf area of the leafy vegetables according to the initial pixel segmentation map by using a CAM-K algorithm; inputting the leaf area and the growth environment light parameters of the leafy vegetables into a leafy vegetable growth index prediction model to obtain a growth index of the leafy vegetables; and adjusting the growth environment light parameters according to the growth index of the leafy vegetables. The present disclosure achieves automated and intelligent control of light conditions in the growth environment of leafy vegetables.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

An objective of the present disclosure is to provide a light regulation method, system, and apparatus for a growth environment of leafy vegetables, to achieve automated and intelligent control of light conditions in a growth environment of leafy vegetables.

In order to make the above objective, features and advantages of the present disclosure clearer and more comprehensible, the present disclosure will be further described in detail below in combination with accompanying drawings and particular implementation modes.

Embodiment 1

Figure 1:
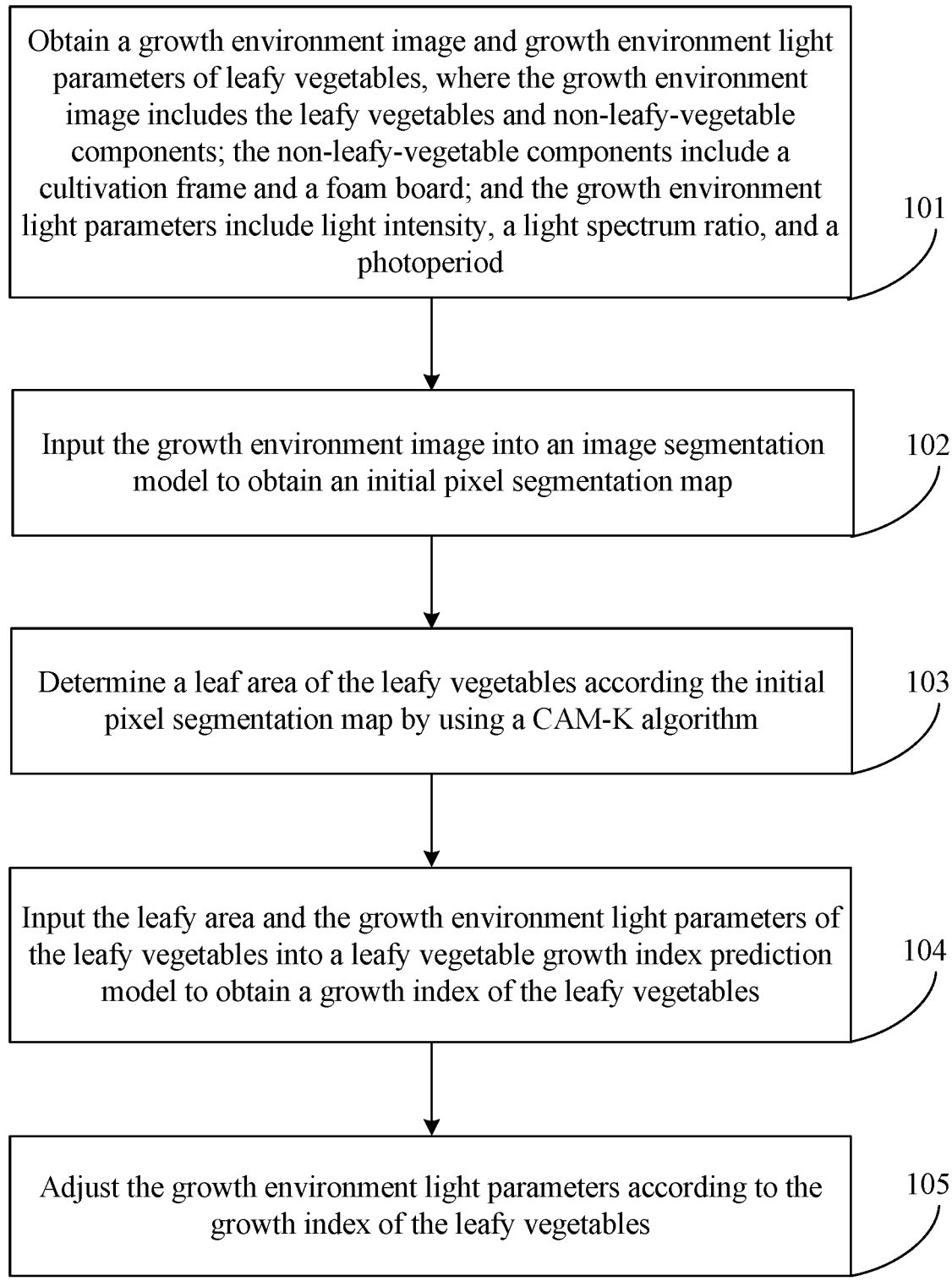
FIG. 1 is a schematic flowchart of a light regulation method for a growth environment of leafy vegetables according to Embodiment 1 of the present disclosure.

FIG. 1 is a schematic flowchart of a light regulation method for a growth environment of leafy vegetables according to Embodiment 1 of the present disclosure. As shown in FIG. 1, the light regulation method for a growth environment of leafy vegetables in this embodiment includes the following steps:

Step 101: Obtain a growth environment image and growth environment light parameters of leafy vegetables, where the growth environment image includes the leafy vegetables and non-leafy-vegetable components; the non-leafy-vegetable components include a cultivation frame and a foam board; and the growth environment light parameters include light intensity, a light spectrum ratio, and a photoperiod.

Specifically, the growth environment image includes an RGB image and a depth image, and enhancement processing is performed on the growth environment image to improve the contrast of the image.

Step 102: Input the growth environment image into an image segmentation model to obtain an initial pixel segmentation map. The image segmentation model is obtained by training a YOLOv7 object detection network using a first training dataset, and the first training dataset includes a plurality of training leafy vegetable growth environment images and corresponding training pixel segmentation maps.

Step 103: Determine a leaf area of the leafy vegetables according the initial pixel segmentation map by using a CAM-K algorithm. The CAM-K algorithm includes a CAM algorithm and a K-Means clustering algorithm.

Step 104: Input the leaf area and the growth environment light parameters of the leafy vegetables into a leafy vegetable growth index prediction model to obtain a growth index of the leafy vegetables. The leafy vegetable growth index prediction model is obtained by training an LSTM network using a second training dataset. The second training dataset includes a plurality of groups of second training data, and the second training data includes leaf areas, growth environment light parameters, and growth indexes of training leafy vegetables at different time points.

Step 105: Adjust the growth environment light parameters according to the growth index of the leafy vegetables.

In an optional implementation, a training process of the image segmentation model specifically includes the following steps:

First, the plurality of training leafy vegetable growth environment images are obtained.

Specifically, the selected scene is the cultivation of leafy vegetables using a hydroponic cultivation frame in an aquaponic container. Images are captured at regular intervals using a Kinect camera in a plurality of time periods. The dataset may contain various objects in the scene, such as cultivation frames, leafy vegetables, fish tanks, and hydroponic cultivation boards.

Second, pixel-level annotation is performed on each training leafy vegetable growth environment image to obtain a corresponding training pixel segmentation map.

Specifically, in this embodiment, the training pixel segmentation maps obtained through manual annotation include accurately annotated images and roughly annotated images. Values of a category parameter indicate two categories: leafy vegetable and non-leafy component. The images are divided into a training set, a testing set, and a validation set based on a ratio of 6:2:2.

Due to the dim lighting inside the aquaponic container, it is challenging for the object detection network to extract texture features from the images. Therefore, images in the dataset need to be processed to enhance the contrast of the images. Both RGB images and depth images are processed by applying filtering operations to reduce noise points. For RGB color images, a hue, saturation, value (HSV) color space method can be used for image enhancement.

In this embodiment, various tricks such as Mosaic data augmentation, adaptive anchor box calculation, and adaptive image scaling are applied to process the data-augmented images, and the processed images are used as inputs of the YOLOv7 object detection network. Mosaic data augmentation involves randomly selecting four images and combining them through random scaling, random cropping, and random arrangement. This technique is primarily used to address the challenge of detecting small objects and improve the robustness of the network. In adaptive anchor box calculation, initial anchor boxes with specified lengths and widths are set for different datasets. During network training, the network outputs a predicted box based on the initial anchor box. The predicted box is then compared with a ground truth box to calculate a difference, and network parameters are updated and iterated based on the difference. Adaptive image scaling is used to handle images with different aspect ratios. In actual application, after scaling and padding of the images, the sizes of black borders on both ends may vary due to different aspect ratios of the images, while excessive padding leads to information redundancy, which affects the inference speed. Therefore, the original image is adaptively padded with the least amount of black borders to improve the inference speed.

The structure of the YOLOv7 network includes a head and a backbone. Features of an input image, with a size of 640×640, are extracted through a stack of convolutions in a backbone module. The output is a 32× downsampled feature map, which is then passed through a head output module. There are three output layers, each with three anchors, corresponding to feature map sizes of 80×80×512, 40×40×1024, and 20×20×1024 respectively. Latest training parameter weight files are generated after training, among which the best-performing parameter weight file is saved. The ELAN and MP structures are mainly used in the detection network backbone, which consists of a total of 50 layers. The first four layers are convolutional layers with a CBS structure. CBS is a combination structure in the YOLOv7 network, which includes a convolution layer, a batch normalization layer, and a SiLU activation function, referred to as CBS for short. The SiLU activation function is a variant of the Swish activation function. The Swish activation function is shown in formula (1):

$$\text{swish}(x) = X \cdot \text{sigmoid}(\beta x) \qquad (1).$$

$\beta$ is a constant or a trainable parameter, and x is a variable parameter. When $\beta=1$, it is referred to as the SiLU activation function, as shown in formula (2):

$$\text{silu}(x) = x \cdot \text{sigmoid}(x) \qquad (2).$$

The detection network backbone primarily uses 1×1 and 3×3 convolutions. The output of each convolution is used as the input for the next convolution, and is also subject to a channel number concatenation operation with the outputs of other convolutions. Such a structure improves the accuracy of the network. After four CBS layers, the size of the feature map becomes 160×160×128. The feature map then goes through the ELAN module, which consists of a plurality of CBS layers. The input and output feature sizes remain the same, but the number of channels changes in the first two CBS layers. The input and output channels remain consistent in the subsequent layers. The output of the last CBS layer serves as the desired network backbone. After four CBS layers, an ELAN module is connected, followed by three Maxpooling (MP) layers with the output of the ELAN module. The MP module has two branches and is used for downsampling. The first branch involves a Maxpooling operation followed by a 1×1 convolution to change the number of channels. The second branch involves a 1×1 convolution to change the number of channels and then a convolution block with a 3×3 convolution kernel and a stride of 2. The convolution block is used for downsampling. Finally, the results of the first branch and the second branch are added together to obtain super-downsampled results, corresponding to sizes of 80×80×512, 40×40×1024, and 20×20×1024. Each MP module includes 5 layers, and the ELAN module includes 8 layers. Therefore, the total number of layers in the entire backbone is 4+8+13×3=51, starting from 0, with the last layer being the 50th layer.

The 32× downsampled feature map finally outputted by the backbone undergoes SPPCSP (which means adding a concatenation after a spatial pyramid pooling (SPP) module to fuse with the feature map before the SPP module, thus enriching the feature information), and the number of channels changes from 1024 to 512. The fusion process includes top-down fusion and then bottom-up fusion with the previous feature map. The function of the SPP module is to increase the receptive field and enable the algorithm to adapt to different resolution images. Different receptive fields are obtained by using max pooling. A Cross Stage Partial (CSP) module first groups features into two parts. One part undergoes conventional processing, while the other part undergoes SPP processing. Finally, the two parts are merged together. This approach reduces the calculation amount by half, thereby improving both the speed and accuracy.

The loss function mainly includes three components: coordinate loss, object confidence loss, and classification loss. For the object confidence loss and classification loss, the BCEWithLogitsLoss function is used (BCEWithLogitsLoss is a commonly used set of loss functions that combines binary cross-entropy loss with logits). For the coordinate loss, the Complete Intersection over Union (CIoU) loss function is used. The BCEWithLogitsLoss function shown in formula (3):

Assuming there are N batches (a batch is a hyperparameter used to define the number of samples to be processed before updating internal model parameters; batching is conceived as iteratively cycling through one or more samples and making predictions; the training dataset can be divided into one or more batches), and each batch predicts q labels, Loss (the loss function) is as follows:

$$\text{Loss} = \{l1, \ldots, lN\}, l_q = -[y_q \log(\sigma(x_q)) + (1 - y_q) \cdot \log(1 - \sigma(x_q))] \qquad (3).$$

Here, $l_q$ represents a loss value of the q-th sample, $y_q$ represents a ground truth class label of the q-th sample, and $x_q$ represents a predicted value of the q-th sample. $\sigma(x_q)$ is a Sigmoid function, which can map $x_q$ to the interval (0, 1). The Sigmoid function is shown in formula (4):

$$\sigma(x_q) = \frac{1}{1 + \exp(-x_q)}. \qquad (4)$$

Intersection over Union (IoU) represents a ratio of the intersection to the union between a ground truth box and a prediction box in object detection, and is defined by formula (5):

$$\text{IoU} = \text{intersection } A / \text{Union } B \qquad (5).$$

When the ground truth box completely overlaps with the prediction box, the IoU is 1. Therefore, in object detection, the bounding box regression loss function is defined as formula (6):

$$\text{LossIoU} = 1 - \text{IoU} \qquad (6).$$

CIoU introduces an aspect ratio factor and can define the aspect ratio relationship between the prediction box and the ground truth box. The specific definition is shown in formulas (7) and (8):

$$CIoU = IoU - \frac{d^2}{c^2} - \frac{v^2}{(1 - IoU) + v}. \qquad (7)$$

$$\text{LossCIoU} = 1 - \text{CIoU} \qquad (8).$$

d represents a distance between center points of the prediction box and the ground truth box; c represents a diagonal distance of the minimum enclosing rectangle; and v is a similarity factor of the aspect ratio, defined as formula (9):

$$v = \frac{4}{\pi^2}\left(\arctan\frac{Wb}{Hb} - \arctan\frac{Wp}{Hp}\right)^2. \qquad (9)$$

Wb and Hb represent the width and height of the ground truth box; Wp and Hp represent the width and height of the prediction box.

Information of initial anchors (predefined boxes), position IoU, foreground-background objects, categories, and the like are extracted using a positive and negative sample matching strategy. Then, the loss function is calculated and a cost matrix is constructed. The top k candidate boxes are selected based on the cost matrix, and duplicate candidate boxes are removed. After the performance is validated using the validation set, final network model parameters are obtained. The generalization ability is tested on the testing set.

Third, the YOLOv7 object detection network is trained with the plurality of training leafy vegetable growth environment images as inputs and the corresponding pixel segmentation maps as outputs, to obtain the image segmentation model.

Specifically, the trained image segmentation model has a quantified baseline accuracy of $A_b$. A threshold a is set, and the accuracy of the image segmentation model after quantization is denoted as $A_q$. Weight quantization should satisfy the following condition: $|A_b-A_q|<\sigma$.

Using knowledge distillation technique, training logic is automatically added to the model. There is no need to modify the training code. By using the trained model and some unlabeled data, the desired effect can be achieved through a few tens of minutes of training. The specific steps are as follows: First, a teacher model is constructed. An inference model file is loaded and a copy of the inference model is made in memory to serve as the teacher model in knowledge distillation. A to-be-quantized model serves as a student model. Secondly, loss is added. The model structure is automatically analyzed to find suitable layers to add distillation loss. The last convolutional layer with trainable parameters of each head is used as a distillation node. Finally, distillation training is performed. The teacher model supervises sparse training or quantization training of the original model through distillation loss, completing the model compression process. After quantization, the model is adjusted and deployed to an embedded terminal.

In a preferred implementation, step 103 specifically includes the following sub-steps:

performing CAM visualization on the initial pixel segmentation map by using the CAM algorithm, to obtain a visualized pixel segmentation map;

overlaying the visualized pixel segmentation map with the initial pixel segmentation map to obtain an overlaid pixel map;

performing clustering on the overlaid pixel map by using the K-Means clustering algorithm to obtain a clustered image;

determining the leaf area of the leafy vegetables according to the clustered image.

Figure 2:
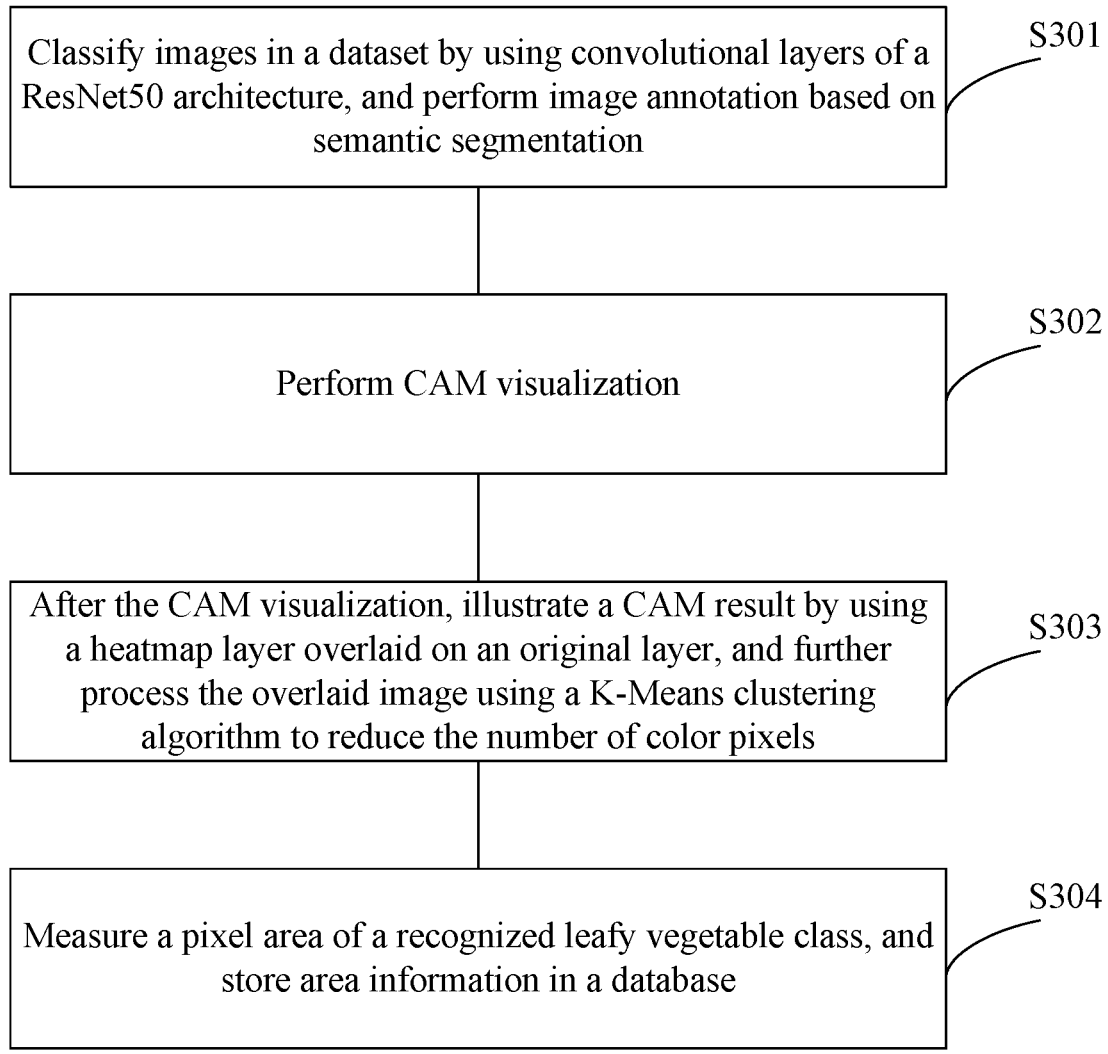
FIG. 2 is a flowchart of determining a leaf area of leafy vegetables by using a CAM-K algorithm.

Specifically, as shown in FIG. 2, step 103 is implemented as follows:

The four coordinates (top, left, bottom, right) of each leafy vegetable, detected by the image segmentation model, in the image are temporarily stored. Then, objects are cropped from the leafy vegetable image with coordinate information by using a matrix operation in OpenCV. Finally, the cropped objects are stored locally to generate a new object dataset.

S301: By using convolutional layers of a ResNet50 architecture, classify a new dataset obtained after object cropping, and perform image annotation based on semantic segmentation. The classification operation is used for further filtering to reduce the number of negative samples, and also used for classifying leafy vegetables and non-leafy-vegetable components. Semantic segmentation refers to assigning a class label to each pixel in the image and representing the pixels with different colors. The resulting pixel map is used for area estimation in subsequent steps.

The architecture used to implement the above process is based on the Fully Convolutional Network (FCN) structure. The FCN includes a sophisticated encoder-decoder architecture that takes an image with three color channels as an input of the encoder. Formula (10) represents input pixel data for the first layer:

$$X^{ch} = \begin{bmatrix} x_{11} & \cdots & x_{1m} \\ \vdots & \ddots & \vdots \\ x_{n1} & \cdots & x_{nm} \end{bmatrix}, y = \begin{bmatrix} y_1 \\ \vdots \\ y_n \end{bmatrix}. \quad (10)$$

$x_{ij} \in R_{n \times m}$, $\forall i=1, 2 \ldots, n$, $\forall j=1, 2 \ldots, m$, $X^{ch}$ is an n×m matrix representing the input image, and n is a total number of image samples. y is a one-dimensional label vector, where each image sample has m features (pixels). $y_1$ represents a ground truth class label of the first sample, and $y_n$ represents the ground truth class label of the n-th sample. The initial layer of this architecture is a dimension-reducing global average pooling (GlobalAveragePooling2D) layer. It sums up the each channel value in each image and then takes the average. The final result has no width and height dimensions and only has two dimensions: quantity and average value. The result can be seen as a plurality of single-pixel images, as shown in formula (11). The activation function is Softmax, as shown in formula (12). The optimization function used is Adaptive Moment Estimation (Adam), which is essentially root mean square prop (RMSprop) with a momentum term. Adam dynamically adjusts the learning rate for each parameter using the first and second moment estimates of the gradients. The advantage of Adam lies in that after bias correction, the learning rate of each iteration has a determined range, making the parameters more stable, as shown in formula (13). The loss function is Categorical Crossentropy (cross-entropy loss function), as shown in formula (14).

$$[B,H,W,C] \rightarrow \text{GlobalAveragePooling2D} \rightarrow [B,C] \quad (11).$$

$$\text{Softmax}(x)_i = \frac{e^{x_i}}{\sum_{j=1}^{z} e^{x_j}}. \quad (12)$$

B, known as Batch, represents a batch size; H, known as Height, represents the number of pixels in a vertical dimension of an image; W, known as Width, represents the number of pixels in a horizontal dimension of an image; and C, known as Channel, represents the number of channels in an image. $e^{x_i}$ represents an exponential function of the i-th input signal $x_i$, and $e^{x_j}$ represents an exponential function of the j-th input signal $x_j$. It is assumed that Softmax$(x)_i$ represents an output of the i-th neuron, and j is in a range of [1, z], where z is the number of neurons in an output layer.

The Softmax function can compress any real vector with a length of U into a real vector with a length within the range [0, 1], where the sum of elements in the vector is 1.

$$\begin{aligned} m_t &= \mu * m_{t-1} + (1-\mu) * g_t; \\ n_t &= v * n_{t-1} + (1-v) * g_t^2 \\ \hat{m}_t &= \frac{m_t}{1-\mu^t} \\ \hat{n}_t &= \frac{n_t}{1-v^t}; \\ \Delta \theta_t &= -\frac{\hat{m}_t}{\sqrt{\hat{n}_t} + \epsilon} * \eta \end{aligned} \quad (13)$$

Here, t is a time step initialized to 0. μ is an exponential decay rate for controlling weight allocation, where the value is usually close to 1, and is 0.9 by default; V is an exponential decay rate for controlling the influence of a squared gradient; $g_t$ represents the gradient at the time step t; θ represents a parameter to be updated; $m_t$ represents a first moment estimate of the gradient; $n_t$ represents a second moment estimate of the gradient; $\hat{m}_t$ represents the correction for $m_t$; $\hat{n}_t$ represents the correction for $n_t$; η represents an initial learning rate; represents a vector parameter difference; and ∈ represents a constant added for maintaining numerical stability.

$$\text{Loss} = -\sum_{i=1}^{outputsize} y_i \times \log \hat{y}_i. \quad (14)$$

Here, $y_i$ represents a ground truth class label of the i-th sample; $\hat{y}_i$ represents a predicted value of the label for the i-th sample; and outputsize represents the number of neurons in the output layer. According to formula (14), $y_i$ can only be 0 or 1. When $y_i$ is 0, the result is 0, and the loss is calculated only when $y_i$ is 1. This means that Categorical_Crossentropy focuses on a single outcome and is commonly used in conjunction with Softmax for single-label classification tasks.

After the image classification is completed, to identify a theme region in each object-annotated image, segmentation is performed in three steps: object contour recognition, image segmentation, and binary classification for each pixel. A semantic segmentation is used. First, the classified image is converted into a 224×224×3 array as a main input for the FCN. Then, the encoder acts as a feature extractor, to process the pixels of the entire convolutional layer into a feature map. The initial FCN layers extract lower-level features such as object edges, while subsequent layers aggregate these features into higher-level object features through downsampling. The downsampled object feature mappings are fed into subsequent convolutional layers for decoding operations, as shown in formula (15):

$$H(X) = F(X) + X \quad (15).$$

X represents an input. H(X) represents a predicted value, which is a combined output of F(X) that is obtained after mapping of X and the original X, where the combined output is obtained through a main path traversing the convolutional layers and a shortcut path. F(X) represents a residual value. The decoding part then labels each input feature and gradually samples the details of the original image. The output of the FCN is a pixel-level annotated segmentation map of the original image, referred to as a pixel map.

S302: Perform CAM visualization. Among various CAM algorithms, the last layer of the ResNet-50 model is used to calculate the class activation mapping for each image. The class activation mapping is a weight matrix obtained by mapping each pixel of the image using a specific activation. The activation generates a class label for recognition. In addition to the class activation map, the saliency map can also identify locations of pixels that have the greatest impact on the final classification result. Therefore, by combining class activation and saliency mapping, the gradient-weighted classes can be settled at their influential positions. Three commonly used class activation mappings are Grad-CAM, Grad-CAM++, and ScoreCAM.

Grad-CAM is a combination of class activation and saliency mapping. It uses information from the last convolutional layer to rank the pixel importance for a specific label class. To do this, the gradient score for each class is mapped to the image features, and gradient weights of the classes are obtained using global average pooling. This is shown in formula (16):

$$W_m^c = \frac{1}{Z} \sum_i \sum_j \frac{\partial y^c}{\partial A_{i,j}^m}. \quad (16)$$

$w_m^c$ represents a weight matrix with a size of n×m, capturing important feature mappings m for each label class c. Z represents a separated activation mapping used to map the number of pixels in $A^m$; and (i,j) represents a spatial position in the activation map $A^m$. $y^c$ represents a gradient score for each mapped pixel. The obtained weight matrix is then multiplied with the last convolutional layer, followed by activation using a rectified linear unit (ReLU) activation function, as shown in formula (17):

$$L_{Grad-CAM}^c = \text{Relu}(\Sigma_m w_m^c A^m) \quad (17).$$

$L_{Grad-CAM}^c$ represents a Grad-CAM localization map for the label class c. This process generates a heatmap that highlights important pixels in the leafy vegetable class. In the Grad-CAM algorithm, the ReLU function assigns positive weights to important labels and zero weights to less influential pixels.

To enhance the localization ability of the Grad-CAM algorithm, the partial derivatives of the relevant activation mapping $A_{i,j}^m$ is rearranged to generate gradient weight factors that show the importance of each pixel position, as shown in formula (18):

$$\alpha_{i,j}^{mc} = \frac{\frac{\partial^2 y^c}{(\partial A_{i,j}^m)^2}}{2\frac{\partial^2 y^c}{(\partial A_{i,j}^m)^2} + \sum_a \sum_a A_{a,b}^m \frac{\partial^3 y^c}{(\partial A_{i,j}^m)^3}}. \quad (18)$$

$\alpha_{i,j}^{mc}$ represents a gradient weight of each label class c at the pixel position (i,j); and (a, b) represents a spatial position in $A^m$.

The gradient weight is then added to the Grad-CAM localization map to increase the intensity of each pixel, enhancing the classification accuracy of objects that appear multiple times in the image, as shown in formula (19):

$$W_m^c = \sum_i \sum_j \alpha_{i,j}^{mc} \text{ReLU}\left(\frac{\partial y^c}{\partial A_{i,j}^m}\right). \quad (19)$$

The activation map is obtained using the ReLU activation function, as shown in formula (20):

$$L_{Grad-CAM++}^c = \text{Relu}(\Sigma_m w_m^c A^m) \quad (20).$$

$L_{Grad-CAM++}^c$ represents a Grad-CAM++ localization map for the label class c.

Score-CAM uses scoring weights from the classification labels instead of weighted information from the last convolutional layer. This enables Score-CAM to independently visualize machine vision, leading to better generalization, as shown in formula (21):

$$A_{i,j}^m = \frac{A_{i,j}^m}{\max(A^m) - \min(A^m)}. \quad (21)$$

The activation maps are then normalized to obtain masked images ($M'''$) of the processed activation mappings, as shown in formula (22):

$$W_m^c = \text{Softmiax}(M''') \quad (22)$$

$W_m^c$ is a weight matrix obtained by extorting the target class score of the m-th activation mapping. The class activation mapping of the Score-Map is obtained from formula (23):

$$L_{Score\text{-}CAM++}^c = \text{Relu}(\Sigma_m w_m^c A^m) \quad (23)$$

Each CAM algorithm adds a heatmap to illustrate the gradient-weighted pixel class of the entire image. The heatmaps generated by the CAM algorithms are overlaid with the original image, and then the K-means clustering algorithm is applied to the overlaid leafy vegetable classification image.

S303: After the CAM visualization, illustrate a CAM result by using a heatmap layer overlaid on an original layer, and further process the overlaid image using a K-Means clustering algorithm to reduce the number of color pixels.

Specifically, hyperparameters are initialized, including random initialization of the number of attempts and the color clusters. According to the initialized hyperparameters, K cluster centers are randomly selected, as shown in formula (24):

$$c_1, c_2, \ldots, c_k \in \in R^m, \forall k = 2, \ldots k \quad (24)$$

Here, k represents the number of clusters, which is predetermined randomly; c represents the coordinates of each centroid for the k-th color cluster of each image, where $x_i \in R^n$.

Next, the distance between each color pixel and its nearest cluster centroid is calculated, as shown in formula (25):

$$D = \sum_{k=2}^{K} \sqrt{\sum_{j=1}^{m} x_j} - c_k^2. \quad (25)$$

Here, D represents an m×k matrix that finds an average value $x_j \in R^m$ of distances between each color pixel and its nearest cluster centroid $c_k$.

Then, color pixel assignment is performed. The distance matrix in formula (25) is used to assign each color pixel $x_j$ to its nearest cluster centroid $c_k$, and k clusters are created, as shown in formula (26):

$$D = \{D_1, D_2, \ldots, D_K\} \quad (26)$$

$D_K$ represents a clustering error for the K-th cluster, indicating a total distance of all color pixels in the cluster to the centroid. The main objective of the K-Means clustering algorithm is to minimize $D_K$. Therefore, the standard penalty-free K-Means formula from the Scikit-learn library in Python is used.

Finally, a new cluster centroid set is calculated to further minimize the clustering error. Using the pixel assignment in formula (25), the cluster centroids $c_k$ are updated. The steps from formula (25) to formula (26) are repeated until the algorithm converges to a minimum.

S304: Measure a pixel area of a recognized leafy vegetable class (after the foregoing processing on the image, the leafy vegetable part in the image has been marked with a color, and the area of the measured object can be obtained by counting the number of pixels occupied by the object on the image), and store area information in a database.

Specifically, the K-Means algorithm completes all the attempts, and the color pixels are grouped into K main colors. Then, the resulting color clusters are classified into a leafy vegetable class and non-leafy-vegetable classes. A pixel area of the recognized leafy vegetable class is measured, and the area information is stored in the database.

In an optional implementation, a training process of the leafy vegetable growth index prediction model specifically includes:

obtaining leaf areas and growth environment light parameters of each training leafy vegetable at different time points from the second training data;

calculating a growth index of each training leafy vegetable according to the leaf areas and the growth environment light parameters at different time points;

training the LSTM network by using all the leaf areas and the corresponding growth environment light parameters as inputs and the growth indexes of the training leafy vegetables as labels, to obtain the leafy vegetable growth index prediction model.

Figure 3:
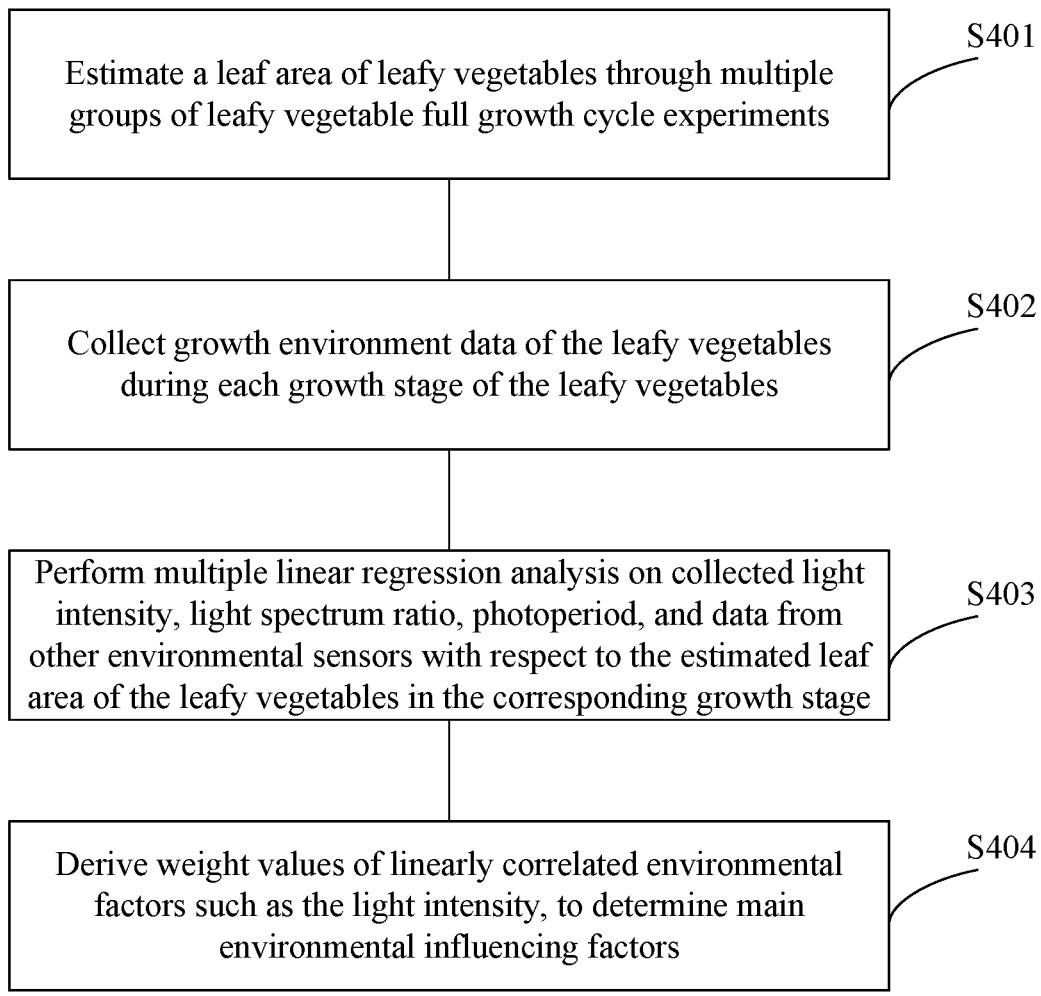
FIG. 3 is a flowchart of a multiple linear regression model.

Specifically, as shown in FIG. 3, in practical operations, a determining process of the leafy vegetable growth index prediction model includes the following steps:

S401: Estimate a leaf area of leafy vegetables through multiple groups of leafy vegetable full growth cycle experiments.

Specifically, 6 leafy vegetable plants are randomly selected from each group of cultivation objects for leaf area measurement. The leafy vegetable plants are photographed every 7 days from directly above, capturing both a reference object and the leafy vegetables (top view) during the photography process. A Kinect camera is used to capture RGB and depth image information of the leafy vegetables, and the entire image is processed using a filtering algorithm, to repair information-invalid areas and noise information.

S402: Collect growth environment data of the leafy vegetables during each growth stage of the leafy vegetables.

Specifically, the growth environment data of the leafy vegetables includes light intensity, a light spectrum ratio, a photoperiod, and data obtained from other environmental sensors.

S403: Perform multiple linear regression analysis on collected light intensity, light spectrum ratio, photoperiod, and data from other environmental sensors with respect to the estimated leaf area of the leafy vegetables in the corresponding growth stage.

Specifically, the leaf area of the leafy vegetables is used as the dependent variable and the collected environmental data such as the light intensity is used as the multivariate independent variables. Regression analysis is performed on the data to obtain correlation coefficients and the regression equation is estimated based on the analysis.

S404: Derive weight values of linearly correlated environmental factors such as the light intensity, to determine main environmental influencing factors.

Figure 4:
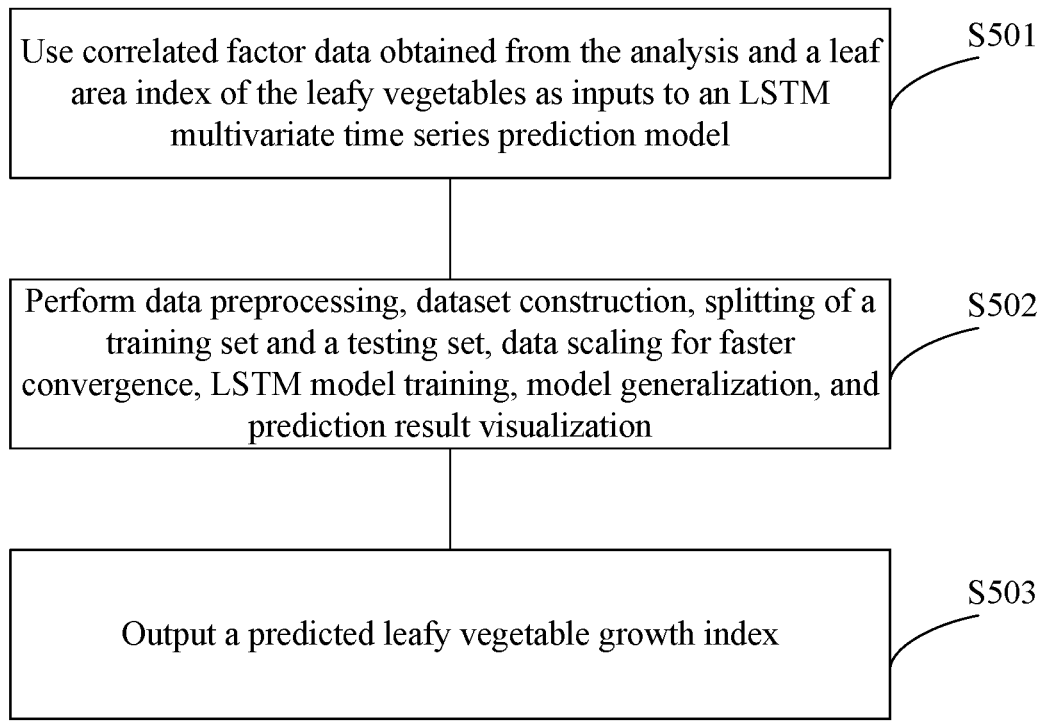
FIG. 4 is a flowchart of an LSTM multivariate time series prediction model.

Further, the data obtained from the multiple linear regression model, which includes the linearly correlated factors such as the light intensity, and the leaf area data in the corresponding leafy vegetable growth stage are inputted into an LSTM multivariate time series prediction model to obtain a leafy vegetable growth index as an output, as shown in FIG. 4. The specific steps are described below.

As can be learned from the multiple linear regression analysis, in the leafy vegetable growth cycle, environmental factors such as effective light is highly correlated with a leaf area index.

S501: Use the correlated factor data obtained from the analysis and a leaf area index of the leafy vegetables as inputs to an LSTM multivariate time series prediction model.

S502: Perform data preprocessing, dataset construction, splitting of a training set and a testing set, data scaling for faster convergence, LSTM model training, model generalization, and prediction result visualization.

Specifically, the data is first preprocessed to standardize the data format. Then, the datasets are constructed by converting the data into an array format for storage and splitting the data into a training set and a testing set in a proportional manner. The data in both the training set and the testing set are scaled to the range of [−1, 1] to accelerate convergence. LSTM model training can be started once the datasets are constructed. The LSTM model is initialized and trained by setting parameters such as the number of neuron cores and the input data format during training. Finally, the model is generalized, and the prediction results are visualized.

S503: Output a predicted leafy vegetable growth index.

Specifically, the LSTM multivariate time series prediction model processes and analyzes the inputted environmental data and leaf area data of the leafy vegetables to predict a leaf area index for the next stage. The output is defined as the growth index of the leafy vegetables. Through the above steps, the growth status of the leafy vegetables can be analyzed and evaluated.

In an optional implementation, the step of obtaining a growth environment image of leafy vegetables specifically includes:
  obtaining an RGB image and a corresponding depth image of an environment of the leafy vegetables;
  determining the RGB image and the corresponding depth image of the environment of the leafy vegetables as the growth environment image.

In an optional implementation, the step of determining the leaf area of the leafy vegetables according to the clustered image specifically includes:
  determining the number of pixels labeled as leaves of the leafy vegetables in the clustered image;
  calculating the leaf area of the leafy vegetables according to the number of pixels.

Embodiment 2

Figure 5:
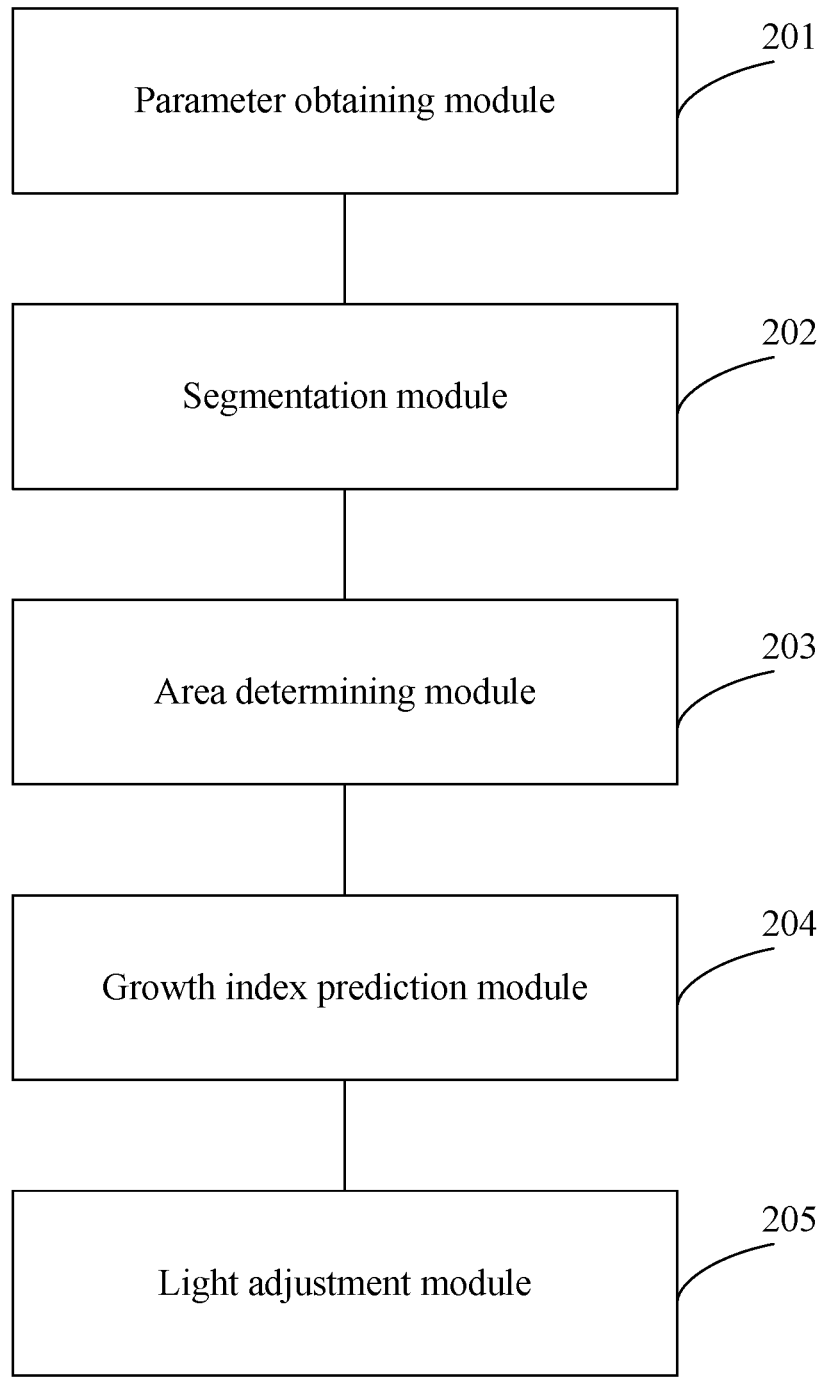
FIG. 5 is a schematic structural diagram of a light regulation system for a growth environment of leafy vegetables according to Embodiment 2 of the present disclosure.

FIG. 5 is a schematic structural diagram of a light regulation system for a growth environment of leafy vegetables according to Embodiment 2 of the present disclosure. As shown in FIG. 5, the light regulation system for a growth environment of leafy vegetables in this embodiment includes a parameter obtaining module 201, a segmentation module 202, an area determining module 203, a growth index prediction module 204, and a light adjustment module 205.

The parameter obtaining module 201 is configured to obtain a growth environment image and growth environment light parameters of leafy vegetables, where the growth environment image includes the leafy vegetables and non-leafy-vegetable components; the non-leafy-vegetable components include a cultivation frame and a foam board; and the growth environment light parameters include light intensity, a light spectrum ratio, and a photoperiod.

The segmentation module 202 is configured to input the growth environment image into an image segmentation model to obtain an initial pixel segmentation map, where the image segmentation model is obtained by training a YOLOv7 object detection network using a first training dataset, and the first training dataset includes a plurality of training leafy vegetable growth environment images and corresponding training pixel segmentation maps.

The area determining module 203 is configured to determine a leaf area of the leafy vegetables according to the initial pixel segmentation map by using a CAM-K algorithm, where the CAM-K algorithm includes a CAM algorithm and a K-Means clustering algorithm.

The growth index prediction module 204 is configured to input the leaf area and the growth environment light parameters of the leafy vegetables into a leafy vegetable growth index prediction model to obtain a growth index of the leafy vegetables, where the leafy vegetable growth index prediction model is obtained by training an LSTM network using a second training dataset, the second training dataset includes a plurality of groups of second training data, and the second training data includes leaf areas, growth environment light parameters, and growth indexes of training leafy vegetables at different time points.

The light adjustment module 205 is configured to adjust the growth environment light parameters according to the growth index of the leafy vegetables.

Embodiment 3

Figure 6:
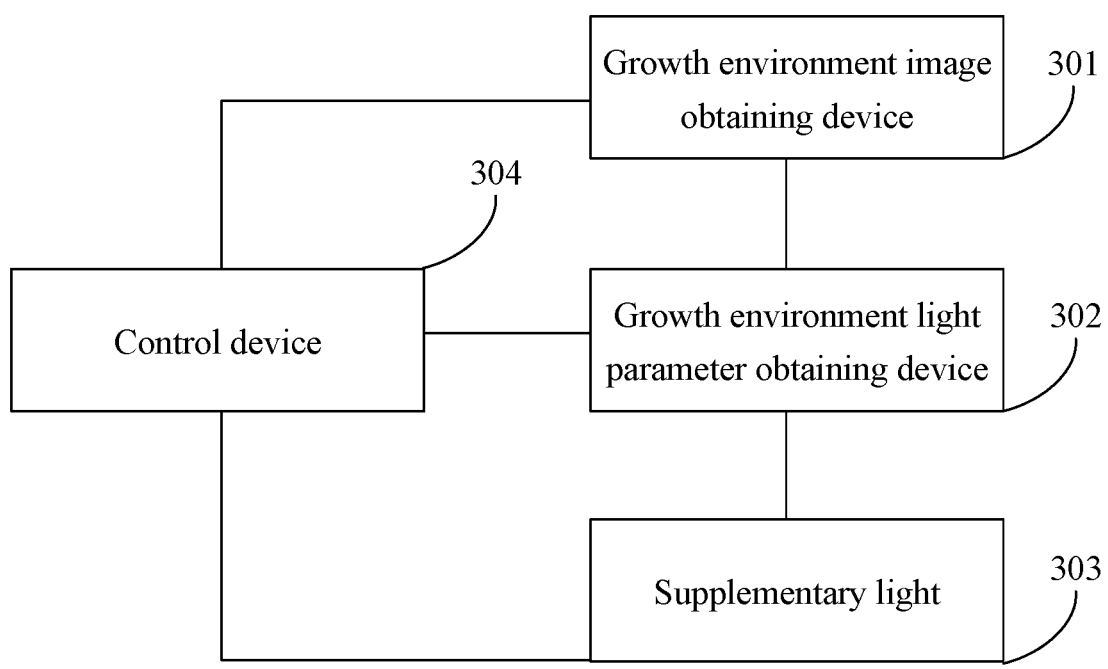
FIG. 6 is a schematic structural diagram of a light regulation apparatus for a growth environment of leafy vegetables according to Embodiment 3 of the present disclosure.

FIG. 6 is a schematic structural diagram of a light regulation apparatus for a growth environment of leafy vegetables according to Embodiment 3 of the present disclosure. As shown in FIG. 6, the light regulation apparatus for a growth environment of leafy vegetables is used for implementing the light regulation method for a growth environment of leafy vegetables in Embodiment 1. The light regulation apparatus for a growth environment of leafy vegetables includes a growth environment image obtaining device 301, a growth environment light parameter obtaining device 302, a supplementary light 303, and a control device 304. The growth environment image obtaining device 301, the growth environment light parameter obtaining device 302, and the supplementary light 303 are connected to the control device 304.

The growth environment image obtaining device 301 is configured to obtain a growth environment image of leafy vegetables, where the growth environment image includes the leafy vegetables and non-leafy-vegetable components; and the non-leafy-vegetable components include a cultivation frame and a foam board.

The growth environment light parameter obtaining device 302 is configured to obtain growth environment light parameters of the leafy vegetables, where the growth environment light parameters include light intensity, a light spectrum ratio, and a photoperiod.

The control device 304 is configured to:
  segment the growth environment image of the leafy vegetables by using an image segmentation model, to obtain an initial pixel segmentation map;
  determine a leaf area of the leafy vegetables according to the initial pixel segmentation map by using a CAM-K algorithm;
  determine a growth index of the leafy vegetables based on the leaf area of the leafy vegetables by using a leafy vegetable growth index prediction model;
  adjust the supplementary light 303 according to the growth index of the leafy vegetables, thereby adjusting the growth environment light parameters.

Figure 7:
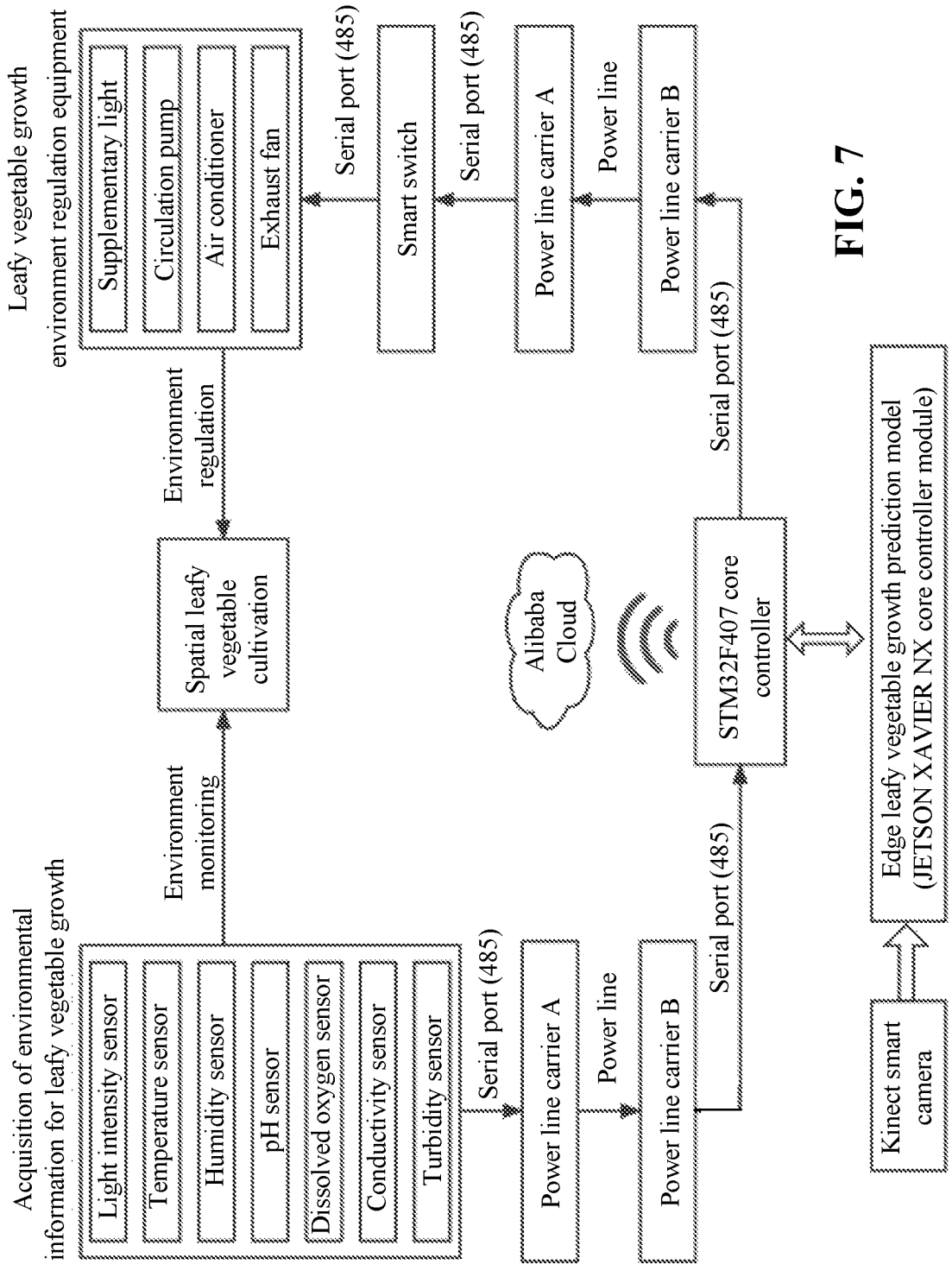
FIG. 7 is a diagram of an overall architecture of the light regulation apparatus for a growth environment of leafy vegetables.

Specifically, as shown in FIG. 7, the light regulation apparatus for a growth environment of leafy vegetables specifically includes a leafy vegetable growth environment information acquisition and regulation device and an edge leafy vegetable growth prediction module.

The leafy vegetable growth environment information acquisition and regulation device is equipped with various types of sensors (i.e., the growth environment light parameter obtaining device), a Kinect camera (i.e., the growth environment image obtaining device), a power line carrier module, a smart switch, leafy vegetable growth environment regulation equipment, and a control device (including STM32F407 core controller and JETSON XAVIER NX core controller module).

Preferably, the various types of sensors include a light intensity sensor, a temperature sensor, a humidity sensor, a pH sensor, a dissolved oxygen sensor, a conductivity sensor, and a turbidity sensor. The sensors are used to collect multidimensional environmental perception information of the leafy vegetable growth environment. The multidimensional environmental perception information includes both growth environment information and regulation equipment status information. The growth environment information includes light intensity, temperature and humidity, pH value, dissolved oxygen concentration, conductivity, and turbidity. The regulation equipment status information includes a current value, voltage value, surface temperature value, and electrical power value of the equipment (mainly the supplementary light).

Preferably, the Kinect camera, connected to the JETSON XAVIER NX core controller through a USB to serial port, is placed on the top of the leafy vegetable cultivation frame. The Kinect camera can simultaneously collect the RGB image and depth image of the leafy vegetable growth. The RGB image can be used for object detection, and the depth image can directly reflect the geometry of the visible surface of the leafy vegetables. The depth image can be used for object detection and image segmentation of the three-dimensional information of the leafy vegetables. The collected RGB image and depth image of the leafy vegetables are both transmitted to the JETSON XAVIER NX core controller for the image processing at the edge.

Preferably, the power line carrier module (the power line carrier module includes a power line carrier A, a power line, and a power line carrier B in FIG. 7, and is mainly used for a communication connection between a leafy vegetable growth environment information acquisition module (various types of sensors) and the core controller as well as a communication connection between the core controller and the regulation equipment) refers to a special communication method that utilizes a high-voltage power line (which usually refers to the voltage level of 35 kV and above in the field of the power carrier), a medium-voltage power line (which refers to the voltage level of 10 kV), or a low-voltage distribution line (380/220V user line) as an information transmission medium. The leafy vegetable growth environment information is obtained based on the power line carrier technology, and communication with STM32F407 and an intelligent switch is implemented through an RS485 bus.

Preferably, the smart switch refers to a unit that utilizes a combination of control boards and electronic components along with programming to achieve intelligent circuit switching control. It receives signals transmitted by the power line carrier module and controls the regulation equipment such as the supplementary light through the RS485 bus.

Preferably, various types of regulation equipment include a supplementary light, a circulation pump, an air conditioner, and an exhaust fan. The supplementary light adjusts the light intensity, light spectrum ratio, and photoperiod according to the regulation parameters (for light intensity, light spectrum ratio, and photoperiod) transmitted to the STM32F407 core controller from the edge leafy vegetable growth prediction model (The prediction algorithm is deployed in the JETSON XAVIER NX core controller module, while the STM32 controller adjusts lighting and other regulation equipment based on the output of the algorithm). The circulation pump is used to recycle water from the fish tank in the aquaponic system for use in hydroponic cultivation of leafy vegetables. The air conditioner is used to regulate the temperature of the growth environment. The exhaust fan is used to adjust the temperature and humidity within the container, primarily focusing on humidity regulation. The circulation pump is mainly used to provide power for the water supply of hydroponically grown lettuce and recycle water resources within the system. It does not require parameter adjustments, and is started or stopped using the smart switch.

In a preferred embodiment of the present disclosure, the core controller is an STM32F407 series development board. This board is equipped with multiple serial ports, and has a fast Analog-to-Digital Converter (ADC) sampling speed and Serial Peripheral Interface (SPI) communication speed. It provides high real-time performance and includes an Ethernet module. The numerous communication interfaces allow for the collection of more external information and sensor data, such as light intensity, temperature and humidity, pH value, dissolved oxygen concentration, conductivity, and turbidity.

Preferably, the JETSON XAVIER NX core controller module is equipped with specialized artificial intelligence (AI) cores and graphics processors that support AI system operations. It can process a large amount of data in a very short time to achieve edge computing. It serves as the information processing core at the edge of the entire intelligent light regulation model for leafy vegetable growth environment, and has the following functions: First, it receives command signals from the upper computer and collects leafy vegetable growth image information using the integrated Kinect camera. Second, a YOLOv7 object detection network and an automatic pixel area estimation framework that combines the K-Means algorithm with the deep learning-based CAM visualization technology are deployed on the development board. This framework performs operations such as object detection, image segmentation, and image processing on the leafy vegetables. Third, a leafy vegetable growth area prediction model based on multiple linear regression and LSTM multivariate time series is deployed on the development board. This model can predict a leafy vegetable growth area in the next stage by using the collected multidimensional environmental perception information and current leafy vegetable area information, thus obtaining a growth index of leafy vegetables. Fourth, optimal growth data and environmental information for each growth stage of the leafy vegetables obtained based on historical experience are stored in the module. The growth index of the leafy vegetables obtained from the leafy vegetable growth area prediction model based on multiple linear regression and LSTM multivariate time series is compared with the stored optimal data, to make a decision for leafy vegetable growth regulation, thus obtaining regulation parameters for light intensity, light spectrum ratio, and photoperiod. Fifth, it can transmit the regulation parameters for light intensity, light spectrum ratio, and photoperiod to the lower computer for the regulation of the leafy vegetable growth light environment.

Preferably, the apparatus further includes a hydroponic cultivation frame for leafy vegetables, a Kinect camera fixture, and a supplementary lighting set for light regulation. The Kinect camera is mounted on the upper part of the hydroponic cultivation frame, maintaining a certain distance from the supplementary lighting set to avoid overexposure when capturing image information. The Kinect camera fixture, made from lightweight materials such as aluminum alloy, is mounted on the hydroponic cultivation frame for cycle monitoring. To better capture the growth image information of the leafy vegetables, the fixture can adjust its height in real time based on the growth status of the leafy vegetables, ensuring that the Kinect camera captures the entire leaf surface of the leafy vegetables.

The Kinect camera is primarily used to capture images of the entire leaf surface of the leafy vegetables within the hydroponic cultivation frame. The growth status of the leafy vegetables is accessed using methods like image processing and computer vision.

The supplementary lighting set for light regulation is mainly used to adjust the required light intensity, light spectrum ratio, and photoperiod within the leafy vegetable growth environment based on the foregoing assessment information of the growth status of the leafy vegetables.

The upper computer should achieve the following functions: (1) Real-time reading of multidimensional environmental data collected by various sensors, and RGB image and depth image data captured by the Kinect camera. (2) Sending corresponding control commands to control corresponding regulation equipment. (3) Displaying the leafy vegetable growth index obtained from the correlation analysis based on the multiple linear regression model and the leafy vegetable growth area prediction model based on the LSTM multivariate time series, as well as the regulation parameters for light intensity, light spectrum ratio, and photoperiod. (4) Sending control information to the STM32F407 core controller to control on/off of the equipment. (5) Displaying, in the upper computer, the operational status of various equipment.

After the control parameters are determined using the control device, based on a comparison of multiple sets of experimental data and expert experience, relationships are established between the growth status of the leafy vegetables and related environmental factors such as the light intensity, light spectrum ratio, and photoperiod, thereby obtaining optimal growth data and environmental information for the leafy vegetables during various growth stages. This information is stored in the database of the control device.

By collecting and comparing multiple sets of experimental data and drawing on expert experience, the related environmental data such as light environment data required for optimal growth conditions of the leafy vegetables during different growth stages can be determined. The light environment data includes the light intensity, light spectrum ratio (red-to-blue light spectrum ratio), and photoperiod (on-to-off time ratio of the supplementary light set).

The obtained optimal growth data and environmental information data for the leafy vegetables during different growth stages are used as historical experience to create a rule table, which is stored in the database.

The prediction model constructed is trained using experimental data, and model parameters are adjusted to train and verify the relationships between the optimal growth status of the leafy vegetables and the optimal proportions of the environmental factors such as the light intensity, light spectrum ratio, and photoperiod.

Evaluation is conducted based on the estimated leaf area of the leafy vegetables. The evaluation involves querying the database for the corresponding leaf area of the leafy vegetables in the current growth stage, and accessing the current growth status of the leafy vegetables with reference to the historical experience stored in the database. By comparing the current growth index of the leafy vegetables obtained from the leafy vegetable growth area prediction model based on multiple linear regression and LSTM multivariate time series with the optimal growth data of the corresponding growth stage stored in the database, a regulation decision for leafy vegetable growth is made, to obtain control parameters for the light intensity, light spectrum ratio, and photoperiod. These control parameters are transmitted to the lower computer. The lower issues control commands to adjust the light intensity, light spectrum ratio, and photoperiod of the supplementary light set, thereby regulating the light environment for leafy vegetable growth.

The control parameters are conveyed to the STM32F407 core controller in the lower computer. The lower computer issues control commands based on the control parameters. Based on the Pulse Width Modulation (PWM) technology control signals, the duty cycle of the forward working current of the LED supplementary light set is adjusted to control the light intensity and light spectrum ratio of the LED supplementary light set. A timer is used to adjust the photoperiod.

Based on expert experience, the light compensation point for leafy vegetables is above 1500 Lux, and the saturation point is above 20,000 Lux. Within a certain range, stronger light leads to enhanced photosynthesis, increased metabolism, accelerated growth, and shortened growth cycle. The duration of light exposure in a day should not be less than 5 hours, and the light intensity should not fall below the light compensation point for plants. Leafy vegetables in the flowering and fruiting stage should have an average light intensity of no less than 6000 Lux, while for leafy vegetables in the growth peak, a light intensity above 3000 Lux is preferable. Through the comparison of multiple sets of experimental data in combination with expert experience, based on the obtained assessment of the leafy vegetable growth status and the regulation decision made for leafy vegetable growth, the light intensity is regulated according to the requirements of different growth stages and growth conditions.

The LED supplementary light set consists of a blend of 620-680 nm red light and 400-500 nm blue light. Red light promotes leaf growth in crops, while blue light stimulates root and stem growth. According to expert experience, the optimal red-to-blue light spectrum ratio for leafy vegetables is 6:1 during transplantation and 7:1 during seedling cultivation. Through the comparison of multiple sets of experimental data in combination with expert experience, based on the obtained assessment of the leafy vegetable growth status and the regulation decision made for leafy vegetable growth, the light spectrum ratio is regulated according to the requirements of different growth stages and growth conditions.

Based on expert experience, for leafy vegetables under full artificial lighting, the photoperiod during the early growth stage is 6 hours on and 2 hours off, repeating 3 times a day. During the later growth stage, the photoperiod is 14 hours on and 10 hours off, repeating 2 times a day. Through the comparison of multiple sets of experimental data in combination with expert experience, based on the obtained assessment of the leafy vegetable growth status and the regulation decision made for leafy vegetable growth, the photoperiod is regulated according to the requirements of different growth stages and growth conditions.

Based on regulation of the light environment for leafy vegetable growth, the current growth and environmental data of the leafy vegetables, and the working status of relevant equipment are recorded and updated in the database.

Each embodiment in the description is described in a progressive mode, each embodiment focuses on differences from other embodiments, and references can be made to each other for the same and similar parts between embodiments. Since the system disclosed in an embodiment corresponds to the method disclosed in an embodiment, the description is relatively simple, and for related contents, references can be made to the description of the method.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the content of the description shall not be construed as limitations to the present disclosure.

What is claimed is:

1. A light regulation method for a growth environment of leafy vegetables, comprising:
    obtaining a growth environment image and growth environment light parameters of leafy vegetables, wherein the growth environment image comprises the leafy vegetables and non-leafy-vegetable components; the non-leafy-vegetable components comprise a cultivation frame and a foam board; and the growth environment light parameters comprise light intensity, a light spectrum ratio, and a photoperiod;
    inputting the growth environment image into an image segmentation model to obtain an initial pixel segmentation map, wherein the image segmentation model is obtained by training a YOLOv7 object detection network using a first training dataset, and the first training dataset comprises a plurality of training leafy vegetable growth environment images and corresponding training pixel segmentation maps;
    determining a leaf area of the leafy vegetables according to the initial pixel segmentation map by using a Class Activation Mapping (CAM)-K algorithm, wherein the CAM-K algorithm comprises a CAM algorithm and a K-Means clustering algorithm;
    inputting the leaf area and the growth environment light parameters of the leafy vegetables into a leafy vegetable growth index prediction model to obtain a growth index of the leafy vegetables, wherein the leafy vegetable growth index prediction model is obtained by training a Long Short-Term Memory (LSTM) network using a second training dataset, the second training dataset comprises a plurality of groups of second training data, and the second training data comprises leaf areas, growth environment light parameters, and growth indexes of training leafy vegetables at different time points;
    adjusting the growth environment light parameters according to the growth index of the leafy vegetables;
    wherein the obtaining a growth environment image of leafy vegetables specifically comprises:
    obtaining an RGB image and a corresponding depth image of an environment of the leafy vegetables;
    determining the RGB image and the corresponding depth image of the environment of the leafy vegetables as the growth environment image;
    a training process of the image segmentation model specifically comprises:
    obtaining the plurality of training leafy vegetable growth environment images;
    performing pixel-level annotation on each training leafy vegetable growth environment image to obtain a corresponding training pixel segmentation map;
    training the YOLOv7 object detection network with the plurality of training leafy vegetable growth environment images as inputs and the corresponding pixel segmentation maps as outputs, to obtain the image segmentation model;
    wherein before the performing pixel-level annotation on each training leafy vegetable growth environment image to obtain a corresponding training pixel segmentation map, the method further comprises:
    performing a filtering operation, Mosaic data augmentation, adaptive anchor box calculation, and adaptive image scaling in sequence on each training leafy vegetable growth environment image.

2. The light regulation method for a growth environment of leafy vegetables according to claim 1, wherein the determining a leaf area of the leafy vegetables according to the initial pixel segmentation map by using a CAM-K algorithm specifically comprises:
    performing CAM visualization on the initial pixel segmentation map by using the CAM algorithm, to obtain a visualized pixel segmentation map;
    overlaying the visualized pixel segmentation map with the initial pixel segmentation map to obtain an overlaid pixel map;
    performing clustering on the overlaid pixel map by using the K-Means clustering algorithm to obtain a clustered image;
    determining the leaf area of the leafy vegetables according to the clustered image.

3. The light regulation method for a growth environment of leafy vegetables according to claim 1, wherein a training process of the leafy vegetable growth index prediction model specifically comprises:
    obtaining leaf areas and growth environment light parameters of each training leafy vegetable at different time points from the second training data;
    calculating a growth index of each training leafy vegetable according to the leaf areas and the growth environment light parameters at different time points;
    training the LSTM network by using all the leaf areas and the corresponding growth environment light parameters as inputs and the growth indexes of all the training leafy vegetables as labels, to obtain the leafy vegetable growth index prediction model.

4. The light regulation method for a growth environment of leafy vegetables according to claim 2, wherein the determining the leaf area of the leafy vegetables according to the clustered image specifically comprises:
    determining the number of pixels labeled as leaves of the leafy vegetables in the clustered image;
    calculating the leaf area of the leafy vegetables according to the number of pixels.

5. A light regulation system for a growth environment of leafy vegetables, comprising:
    a parameter obtaining module configured to obtain a growth environment image and growth environment light parameters of leafy vegetables, wherein the growth environment image comprises the leafy vegetables and non-leafy-vegetable components; the non-leafy-vegetable components comprise a cultivation frame and a foam board; and the growth environment light parameters comprise light intensity, a light spectrum ratio, and a photoperiod;

a segmentation module configured to input the growth environment image into an image segmentation model to obtain an initial pixel segmentation map, wherein the image segmentation model is obtained by training a YOLOv7 object detection network using a first training dataset, and the first training dataset comprises a plurality of training leafy vegetable growth environment images and corresponding training pixel segmentation maps;

an area determining module configured to determine a leaf area of the leafy vegetables according to the initial pixel segmentation map by using a Class Activation Mapping (CAM)-K algorithm, wherein the CAM-K algorithm comprises a CAM algorithm and a K-Means clustering algorithm;

a growth index prediction module configured to input the leaf area and the growth environment light parameters of the leafy vegetables into a leafy vegetable growth index prediction model to obtain a growth index of the leafy vegetables, wherein the leafy vegetable growth index prediction model is obtained by training a Long Short-Term Memory (LSTM) network using a second training dataset, the second training dataset comprises a plurality of groups of second training data, and the second training data comprises leaf areas, growth environment light parameters, and growth indexes of training leafy vegetables at different time points;

a light adjustment module configured to adjust the growth environment light parameters according to the growth index of the leafy vegetables;

wherein obtaining the growth environment image of the leafy vegetables specifically comprises:

obtaining an RGB image and a corresponding depth image of an environment of the leafy vegetables;

determining the RGB image and the corresponding depth image of the environment of the leafy vegetables as the growth environment image;

a training process of the image segmentation model specifically comprises:

obtaining the plurality of training leafy vegetable growth environment images;

performing pixel-level annotation on each training leafy vegetable growth environment image to obtain a corresponding training pixel segmentation map;

training the YOLOv7 object detection network with the plurality of training leafy vegetable growth environment images as inputs and the corresponding pixel segmentation maps as outputs, to obtain the image segmentation model;

wherein before pixel-level annotation is performed on each training leafy vegetable growth environment image to obtain the corresponding training pixel segmentation map, the following operations are performed:

a filtering operation, Mosaic data augmentation, adaptive anchor box calculation, and adaptive image scaling are performed in sequence on each training leafy vegetable growth environment image.

6. A light regulation apparatus for a growth environment of leafy vegetables, for implementing the light regulation method for a growth environment of leafy vegetables according to claim 1, wherein the light regulation apparatus for a growth environment of leafy vegetables comprises a growth environment image obtaining device, a growth environment light parameter obtaining device, a supplementary light, and a control device; and the growth environment image obtaining device, the growth environment light parameter obtaining device, and the supplementary light are connected to the control device;

the growth environment image obtaining device is configured to obtain a growth environment image of leafy vegetables, wherein the growth environment image comprises the leafy vegetables and non-leafy-vegetable components; and the non-leafy-vegetable components comprise a cultivation frame and a foam board;

the growth environment light parameter obtaining device is configured to obtain growth environment light parameters of the leafy vegetables, wherein the growth environment light parameters comprise light intensity, a light spectrum ratio, and a photoperiod;

the control device is configured to:

segment the growth environment image of the leafy vegetables by using an image segmentation model, to obtain an initial pixel segmentation map;

determine a leaf area of the leafy vegetables according to the initial pixel segmentation map by using a Class Activation Mapping (CAM)-K algorithm;

determine a growth index of the leafy vegetables based on the leaf area of the leafy vegetables by using a leafy vegetable growth index prediction model;

adjust the supplementary light according to the growth index of the leafy vegetables, thereby adjusting the growth environment light parameters;

wherein obtaining the growth environment image of the leafy vegetables specifically comprises:

obtaining an RGB image and a corresponding depth image of an environment of the leafy vegetables;

determining the RGB image and the corresponding depth image of the environment of the leafy vegetables as the growth environment image;

a training process of the image segmentation model specifically comprises:

obtaining the plurality of training leafy vegetable growth environment images;

performing pixel-level annotation on each training leafy vegetable growth environment image to obtain a corresponding training pixel segmentation map;

training the YOLOv7 object detection network with the plurality of training leafy vegetable growth environment images as inputs and the corresponding pixel segmentation maps as outputs, to obtain the image segmentation model;

wherein before pixel-level annotation is performed on each training leafy vegetable growth environment image to obtain the corresponding training pixel segmentation map, the following operations are performed:

a filtering operation, Mosaic data augmentation, adaptive anchor box calculation, and adaptive image scaling are performed in sequence on each training leafy vegetable growth environment image.

7. The light regulation apparatus according to claim 6, wherein the determining a leaf area of the leafy vegetables according to the initial pixel segmentation map by using a CAM-K algorithm specifically comprises:

performing CAM visualization on the initial pixel segmentation map by using the CAM algorithm, to obtain a visualized pixel segmentation map;

overlaying the visualized pixel segmentation map with the initial pixel segmentation map to obtain an overlaid pixel map;

performing clustering on the overlaid pixel map by using the K-Means clustering algorithm to obtain a clustered image;

determining the leaf area of the leafy vegetables according to the clustered image.

8. The light regulation apparatus according to claim 6, wherein a training process of the leafy vegetable growth index prediction model specifically comprises:

obtaining leaf areas and growth environment light parameters of each training leafy vegetable at different time points from the second training data;

calculating a growth index of each training leafy vegetable according to the leaf areas and the growth environment light parameters at different time points;

training the LSTM network by using all the leaf areas and the corresponding growth environment light parameters as inputs and the growth indexes of all the training leafy vegetables as labels, to obtain the leafy vegetable growth index prediction model.

9. The light regulation apparatus according to claim 7, wherein the determining the leaf area of the leafy vegetables according to the clustered image specifically comprises:

determining the number of pixels labeled as leaves of the leafy vegetables in the clustered image;

calculating the leaf area of the leafy vegetables according to the number of pixels.

\* \* \* \* \*